Nov. 24, 1959   W. E. MARTT   2,914,341
FENDER FOR VEHICLE TRAILER
Filed April 1, 1958
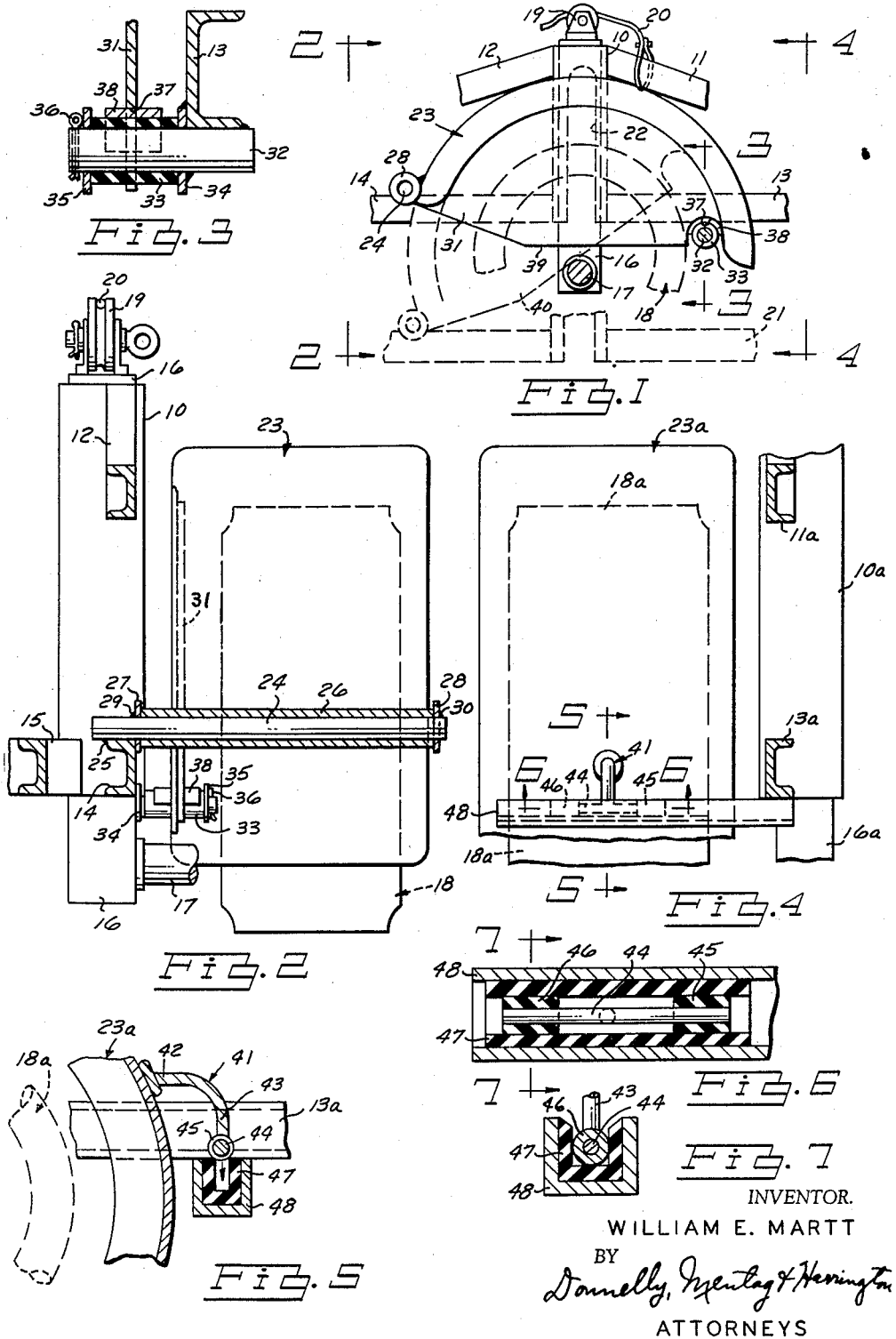
INVENTOR.
WILLIAM E. MARTT
BY
Donnelly, Mentag & Hevington
ATTORNEYS

United States Patent Office 2,914,341
Patented Nov. 24, 1959

2,914,341

FENDER FOR VEHICLE TRAILER

William E. Martt, Highland Park, Mich.

Application April 1, 1958, Serial No. 725,548

4 Claims. (Cl. 280—152)

This invention relates to improvements in vehicle trailers, and, more particularly, to a novel fender construction for vehicle trailers.

Many of the present available vehicle trailers are provided with weight carrying frames which are adapted to be lowered to a point adjacent the ground for loading and unloading purposes. A trailer of this type is shown in United States Patent No. 2,795,432 entitled Boat Trailer and Mechanism for Raising and Lowering the Frame Thereof. According to the laws of most communities all vehicle trailers must be provided with fenders over the wheels thereof to guard against flying matter thrown by the wheels. The provision of a fender on a trailer of the aforementioned type presents a difficult problem due to the fact that the movable frame is the most desirable place on which to mount the fender, but the frame must be movable without interference with the wheels of the trailer.

Accordingly, it is the primary object of this invention to provide a fender construction for use on a vehicle trailer having a movable frame whereby the frame may be moved vertically relative to the wheels of the trailer without interference by the fender disposed over each wheel.

It is another object of this invention to provide a fender construction for use on vehicle trailers having a vertically movable frame wherein the fender is constructed to automatically pivot around the wheel it covers in one direction when the frame is lowered, and to pivot back in the other direction to the normal load transporting position when the frame is raised.

It is a further object of this invention to provide a fender construction of the class described which is economical to manufacture, simple and rugged in construction, and efficient in operation.

Other objects, features and advantages of this invention will be apparent from the following detailed description and appended claims, reference being had to the accompanying drawing forming a part of the specification wherein like reference numerals designate corresponding parts of the several views.

In the drawings:

Fig. 1 is a fragmentary elevational view of a vehicle trailer frame provided with a fender construction, partly in section, made in accordance with the principles of the invention;

Fig. 2 is a fragmentary elevational view, partly in section, of the structure illustrated in Fig. 1, taken along the line 2—2 thereof, and looking in the direction of the arrows;

Fig. 3 is a fragmentary elevational sectional view of the structure illustrated in Fig. 1, taken along the line 3—3 thereof, and looking in the direction of the arrows;

Fig. 4 is a fragmentary elevational view, partly in section, of the structure illustrated in Fig. 1, taken along the line 4—4 thereof, and looking in the direction of the arrows;

Fig. 5 is a fragmentary elevational sectional view, of the structure illustrated in Fig. 4, taken along the line 5—5 thereof, and looking in the direction of the arrows;

Fig. 6 is a fragmentary horizontal sectional view, of the structure illustrated in Fig. 4, taken along the line 6—6 thereof, and looking in the direction of the arrows; and, Fig. 7 is an elevational sectional view of the structure illustrated in Fig. 6, taken along the line 7—7 thereof, and looking in the direction of the arrows.

Referring now to Figs. 1, 2 and 3 of the drawings, a first embodiment of the invention is shown as employed in connection with a vehicle trailer of the type shown in the aforementioned U.S. Patent No. 2,795,432. The trailer shown in said patent includes a vertically movable frame which is carried on a pair of wheels and only a portion of said frame is shown in Figs. 1, 2 and 3. The vertically movable trailer frame includes the following described structure at each of the vehicle wheel positions.

The vehicle trailer frame includes the tubular member 10 to which is fixedly connected, as by welding, the upper frame rails or channels 11 and 12 and the lower frame rails or channels 13, 14 and 15. Slidably mounted in the tubular member 10 is a support member 16 on the outer side of which is fixedly mounted by any suitable means a trailer wheel axle as 17 on which is suitably journalled in the usual manner a trailer wheel 18 shown in dotted lines.

As described in the aforementioned patent, the frame is maintained in a transporting or normal position, as shown in the solid lines in Fig. 1, by means of cables as 20 which have one end secured to one of the upper rails and which passes over a pulley as 19 which is fixedly mounted on the upper end of the support member 16. The cables 20 extend to the forward end of the trailer which is toward the left as viewed in Fig. 1 and are wound on a suitable winch (not shown). The trailer frame may be lowered to the unloading position shown in the dotted lines in Fig. 1 and indicated by the numeral 21 by operating the winch in a proper manner as more fully described in the aforementioned patent. When the frame is lowered to the dotted position 21, the tubular member 10 will slide down the support member 16 and this tubular member 10 is provided with a slot 22 on the outer side thereof so as to permit the tubular member to slide past the axle 17.

A vehicle trailer of the aforementioned type may be provided with a fender construction in accordance with the present invention as hereinafter described. The numeral 23 generally indicates a fender which has the forward end thereof pivotally or hingedly mounted on the shaft or rod 24. The shaft 24 is horizontally disposed and extends laterally outwardly from the trailer frame and is fixedly connected to the upper side of the trailer frame rail 14 as by welding, as indicated by the numeral 25. A sleeve or cylindrical member 26 is rotatably mounted on the shaft 24 and is operatively secured thereon by means of the retainer rings 27 and 28 which are fixedly secured to the shaft 24 as by welding, as indicated by the numerals 29 and 30. The fender 23 is provided on the inner side thereof with the inner vertical wall 31 which is adapted to be seated on the horizontal shaft 32. As best seen in Figs. 2 and 3, the shaft 32 is welded to the underside of the frame rail 13 and extends horizontally laterally outwardly therefrom. The shaft 32 is preferably covered with a suitable resilient material 33 as rubber, the inner end of which abuts the washer or retainer ring 34 which is preferably welded to the rail 13. The rubber tubing 33 is further secured in place by the outer washer 35 and the cotter key 36. The fender wall 31 is provided on the lower rear edge thereof with an inverted U-shaped recess or cut-out portion 37 in which is seated and fixedly secured in place to the wall 31 a horizontal inverted U-shaped rest pad 38. As shown in Fig. 1, in the normal or load transporting frame position, the rear end of the fender 23 is supported by means of the rest pad 38 on the shaft 32. As shown in Fig. 1, the inner wall 31 of the fender 23 is provided with a horizontal lower edge portion 39.

In operation, when the vehicle frame is lowered to the dotted position shown in Fig. 1 and indicated by the numeral 21, the lower horizontal edge 39 of the fender will abut the axle 17 and continued downward movement of the frame will cause the fender 23 to pivot counter-clockwise to the dotted position shown in Fig. 1 and indicated by the numeral 40. When the trailer frame is raised to the solid line position in Fig. 1, the fender 23 will automatically pivot by gravity back to the solid position shown in Fig. 1, it will be seen that the present invention provides a fender for a vehicle trailer of the type described which is hingedly mounted at its front end and adapted to swing around the vehicle wheel when the trailer frame is lowered and raised during loading and unloading operations.

Figs. 4, 5, 6 and 7 illustrate a modification of the means for supporting the rear end of the fender. In this modification the fender 23a is provided with an arm 41 which is fixedly mounted on the outer face of the rear end of the fender and which includes the horizontal portion 42 which terminates in the vertically disposed portion 43 which extends rearwardly and outwardly from the fender 23a. The arm 41 is provided with a horizontal cross piece 44 on the lower end of the vertical portion 43. Each end of the cross piece 44 is covered with a piece of rubber tubing as 45 and 46. This second embodiment of the invention is shown as applied to a trailer frame structure similar to that illustrated in Figs. 1 through 3 and the same reference numerals have been applied followed by the small letter "a."

When the fender 23a is disposed in the normal or transporting position, the cross piece 44 will be seated in the U-shaped rubber seat 47 which is carried in an upwardly facing channel iron 48 which is welded to the underside of the frame rail 13a as shown in Figs. 4 and 5.

The operation of a hingedly mounted fender made in accordance with the second embodiment is the same as that described for the first embodiment except that the fender is supported by the externally mounted structure illustrated in Figs. 4, 5, 6 and 7.

While it will be apparent that the preferred embodiments of the invention herein disclosed are well calculated to fulfill the objects above stated, it will be appreciated that the invention is susceptible to modification, variation and change without departnig from the proper scope or fair meaning of the subjoined claims.

What I claim is:

1. In a vehicle trailer having a frame vertically movable between a transporting position and a loading position relative to the wheels and axle structure supporting the frame, the combination of, a fender over each of the wheels of the trailer, each of said fenders having a vertical wall along the inner side thereof, means hingedly mounting one end of each of said fenders on said frame, and, rest means on said frame at the other end of each of said fenders for support thereof when the frame is in the transporting position, whereby, when the frame is lowered to the loading positon the lower edges of the vertical walls of the fenders will engage the wheel axles and the fenders will pivot in one direction around their respective wheels, and when the frame is raised to the transporting position the fenders will pivot in the other direction until said other ends thereof engage said rest means.

2. The combination of, a vehicle trailer including a wheel, an axle carrying said wheel and a frame vertically movable between a transporting position and a loading position, a shaft extending laterally outwardly from said frame, a fender disposed over said wheel, means pivotally mounting the front end of said fender on said shaft, said fender having a vertical wall along the inner side thereof for engagement with the axle when the frame is lowered to a loading position whereby the fender will pivot around the shaft, and support means for retaining the rear end of said fender above said wheel when the frame is in the transporting position.

3. The structure as defined in claim 2, wherein: said support means includes a second shaft extending laterally outwardly from said frame adjacent the rear end of the fender, and said fender vertical wall resting on said second shaft.

4. The structure as defined in claim 2, wherein: said support means includes an arm extended rearwardly and downwardly from the rear end of said fender, and a support member extending laterally outwardly from said frame and engageable with said arm.

References Cited in the file of this patent

UNITED STATES PATENTS

| 2,311,941 | Gustafson | Feb. 23, 1943 |
| 2,664,577 | Sanborn | Jan. 5, 1954 |
| 2,828,029 | Easley | Mar. 25, 1958 |
| 2,845,300 | Haughton | July 29, 1958 |

FOREIGN PATENTS

| 521,326 | Germany | Mar. 20, 1931 |
| 810,577 | Germany | Aug. 13, 1951 |